(12) United States Patent
Bhagavatula et al.

(10) Patent No.: US 9,494,749 B2
(45) Date of Patent: Nov. 15, 2016

(54) FIBER OPTIC CONNECTORS HAVING A TRANSLATING TRAY ALONG WITH CABLE ASSEMBLIES USING THE CONNECTORS

(71) Applicant: CORNING OPTICAL COMMUNICATIONS LLC, Hickory, NC (US)

(72) Inventors: Venkata Adiseshaiah Bhagavatula, Big Flats, NY (US); Ryan Christopher Sutton, Painted Post, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 77 days.

(21) Appl. No.: 14/296,830

(22) Filed: Jun. 5, 2014

(65) Prior Publication Data
US 2014/0376865 A1    Dec. 25, 2014

Related U.S. Application Data (60) Provisional application No. 61/838,596, filed on Jun. 24, 2013.

(51) Int. Cl.
*G02B 6/42* (2006.01)
*G02B 6/38* (2006.01)
*G02B 6/32* (2006.01)

(52) U.S. Cl.
CPC .......... *G02B 6/4236* (2013.01); *G02B 6/3817* (2013.01); *G02B 6/3853* (2013.01); *G02B 6/3885* (2013.01); *G02B 6/4256* (2013.01); *G02B 6/32* (2013.01); *G02B 6/3849* (2013.01)

(58) Field of Classification Search
CPC ............................ G02B 6/4236; G02B 6/4256
See application file for complete search history.

(56) References Cited

U.S. PATENT DOCUMENTS

| 5,339,379 | A | * | 8/1994 | Kutsch | G02B 6/4452 |
|  |  |  |  |  | 385/135 |
| 5,384,874 | A |  | 1/1995 | Hirai et al. | 385/34 |
| 5,850,493 | A |  | 12/1998 | Cheng | 385/34 |
| 6,899,464 | B2 | * | 5/2005 | Stevens | G02B 6/32 |
|  |  |  |  |  | 385/53 |

(Continued)

FOREIGN PATENT DOCUMENTS

BE    EP 2437090 A1 *  4/2012 .......... G02B 6/3849

OTHER PUBLICATIONS

Chanclou et al; "Design and Demonstration of a Multicore Single-Mode Fiber Coupled Lens Device"; Optics Communications; 233; (2004) 333-339.

(Continued)

*Primary Examiner* — Daniel Petkovsek (57) ABSTRACT

Embodiments disclosed herein include fiber optic connectors that include a tray that translates from a retracted position to an extended position along with cable assemblies using the connector and methods for making the same. In one embodiment, the connector includes a housing, a fiber optic body having an optical interface with at least one optical channel, at least one optical fiber in optical communication with the at least one optical channel of the optical interface, a tray that is movable between a first position that retracts the tray into the housing and a second position where the tray extends from the housing, wherein the fiber optic body is essentially stationary with respect to the tray, and an actuator for moving the tray between the first position and the second position.

20 Claims, 5 Drawing Sheets

(56) References Cited

U.S. PATENT DOCUMENTS

| | | | |
|---|---|---|---|
| 7,603,008 B2 | 10/2009 | Matsumura et al. ........... 385/35 |
| 7,896,559 B2* | 3/2011 | Yi ........................ G02B 6/3817 |
| | | | 385/49 |
| 8,366,326 B2* | 2/2013 | Lin ..................... G02B 6/3885 |
| | | | 385/76 |
| 8,439,575 B2* | 5/2013 | He ...................... G02B 6/3817 |
| | | | 385/53 |
| 8,753,020 B2* | 6/2014 | Wu .................... H01R 13/6593 |
| | | | 385/147 |
| 2011/0026882 A1 | 2/2011 | Budd et al. ..................... 385/52 |
| 2014/0105543 A1* | 4/2014 | de Jong .............. G02B 6/3853 |
| | | | 385/77 |
| 2014/0143996 A1 | 5/2014 | Bhagavatula et al. |
| 2014/0147078 A1 | 5/2014 | Bhagavatula et al. |
| 2014/0185986 A1 | 7/2014 | Costello, III et al. |

OTHER PUBLICATIONS

Cooper et al; "A Fibre Optic Conector Suitable for Use in a Rugged Environment"; Optics and Laser Technology; vol. 14, Issue 2, Apr. 1982, pp. 87-91.

Palais; "Fiber Coupling Using Graded-Index Rod Lenses"; Applied Optics, vol. 19, No. 12, Jun. 15, 1980, pp. 2011-2018.

Emkey et al; "Analysis and Evaluation of Graded-Index Fiber-Lenses"; Journal of Lightwave Technology, vol. LT5, No. 9, Sep. 1987, pp. 1156-1164.

* cited by examiner

FIBER OPTIC CONNECTORS HAVING A TRANSLATING TRAY ALONG WITH CABLE ASSEMBLIES USING THE CONNECTORS

PRIORITY APPLICATION

This application claims the benefit of priority under 35 U.S.C. §119 of U.S. Provisional Application Ser. No. 61/838,596, filed on Jun. 24, 2013, the content of which is relied upon and incorporated herein by reference in its entirety.

FIELD

The technology of the disclosure relates to fiber optic connectors having a translating tray along with cable assemblies using the connectors for making optical connections with complimentary devices.

BACKGROUND

Benefits of optical fiber include extremely wide bandwidth and low noise operation. Because of these advantages, optical fiber is increasingly being used for a variety of applications, including but not limited to broadband voice, video, and data transmission. As electronic devices move toward operation at faster data rates the electrical interfaces on these devices along with the electrical transmission cables will reach their bandwidth capacity limitations. Additionally, the electronic devices are trending to smaller and thinner footprints. Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime.

When the fiber optic connector is desired to be optically connected to an optical device, then a mechanical connection may be needed to mechanically secure the fiber optic connector to the optical device. A more secure fiber optic connection permits a better optical connection by ensuring that fiber optic connection is properly aligned between the optical elements of the connector and the optical device but current techniques of a movable optical interface result in fiber wear, bending or fatigue of the optical fibers within the fiber optic connector. The wear, bending or fatigue may cause attenuation or optical fiber damage. Moreover, conventional alignment and securing means used for connectors in telecommunication applications are not intended for the large number of mating cycles that will be experienced by consumer applications. Consequently, there is an unresolved need for optical connections that may be used for relatively small devices like typical consumer applications such personnel devices such as smart phones, tablets and other consumer devices that have a relatively small footprint. The concepts disclosed herein solve this unresolved need for robust optical connections.

SUMMARY

Embodiments disclosed herein include fiber optic connectors employing a translating tray and related cable assemblies and methods for making. In one embodiment, the fiber optic connector includes a housing, a fiber optic body having an optical interface with at least one optical channel, at least one optical fiber in optical communication with the at least one optical channel of the optical interface, a tray that is movable between a first position that retracts the tray into the housing and a second position where the tray extends from the housing, wherein the fiber optic body is essentially stationary with respect to the tray, and an actuator for moving the tray between the first position and the second position.

In another embodiment, the fiber optic connector includes a housing, a fiber optic body having an optical interface with at least one optical channel, at least one optical fiber in optical communication with the at least one optical channel of the optical interface, a tray that is movable between a first position that retracts the tray into the housing and a second position where the tray extends from the housing, wherein the fiber optic body is essentially stationary with respect to the tray, wherein the optical interface is accessible at a front end of the housing when the tray is in the first position, one or more electrical conductors, wherein the electrical connectors include a stationary portion and a movable portion, and the movable portion of the electrical conductors move with the tray between the first position and the second position and the optical interface does not move with the tray, and an actuator for moving the tray between the first position and the second position.

Methods for making the connectors are also disclosed. In one embodiment, a method of making a cable assembly having a fiber optic connector includes providing a fiber optic body having an optical interface with at least one optical channel, placing the fiber optic body into a housing, providing at least one optical fiber in optical communication with the at least one optical channel of the optical interface, providing a tray that is movable between a first position that retracts into the housing and a second position where the tray extends from the housing, and the fiber optic body is essentially stationary with respect to the tray, and providing an actuator for moving the tray between the first position and the second position.

Additional features and advantages will be set forth in the detailed description which follows, and in part will be readily apparent to those skilled in the art from that description or recognized by practicing the embodiments as described herein, including the detailed description that follows, the claims, as well as the appended drawings. It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include fiber optic connectors employing a translatable (e.g., retractable or movable) alignment and attachment structure and a generally stationary fiber optic body that has an optical interface that is in optical communication with one or more optical fibers of a fiber optic cable. The concepts disclosed allow the translatable alignment and attachment structure to move between a retracted position so the user may easily access the optical interface of the fiber optic connector for inspection and/or cleaning; and an extended position for aligning and mechanically securing the fiber optic connector to a complimentary connector such as an optical port on an electronic device such as a cell phone, tablet, laptop or the like. In one exemplary embodiment, the translatable alignment and attachment structure includes a tray that is movable between a first position that retracts the tray and a second position that extends the tray for attachment of the connector, but may also include other structure such as disclosed herein. Unlike other fiber optic connector designs, the concepts allow the fiber optic body to remain essentially stationary along with the optical fibers of the fiber optic cable that are optically attached thereto. In other words, the optical fibers will not be subject to movement or stress when connecting to a complimentary connector. Consequently, the concepts and designs disclosed inhibit optical fiber attenuation and/or damage to the optical fibers when subjected to large number of mating cycles that are expected with consumer electronics and the like.

Figure 1:
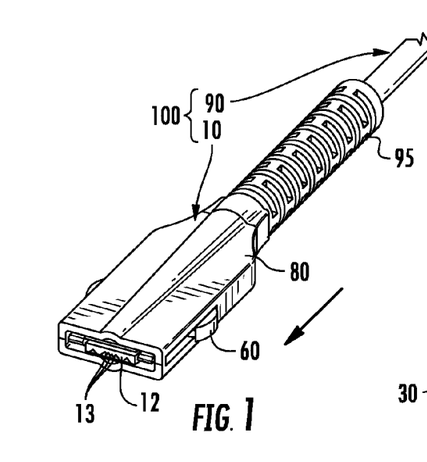
FIG. 1 is a perspective view of an explanatory fiber optic connector with a tray in a retractable position for providing access to the optical interface.
Figure 2:
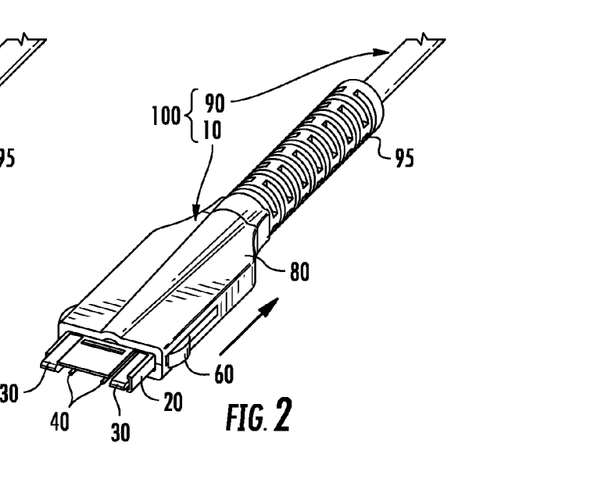
FIG. 2 is a perspective view of the fiber optic connector of FIG. 1 with the tray in an extended position and ready for mating with a complimentary receptacle on an electronic device.

FIG. 1 is a perspective view of an explanatory fiber optic connector 10 (hereinafter "connector") showing a tray 20 in a retracted position and FIG. 2 is a perspective view of the connector 10 with the tray 20 in the extended position. When the tray 20 is in the retracted position the connector 10 allows access to the optical interface 12 that has at least one optical channel 13. In other words, tray 20 is movable between a first position that retracts the tray into the housing 80 and a second position where the tray 20 extends from the housing 80. Moreover, the tray 20 is movable while the fiber optic body that may include the optical interface is stationary with respect to the tray 20 so that the optical fibers of cable 90 may be fixed so they need not translate with the alignment and attachment structure. Moreover, when the tray 20 is in the retractable position the user has access to the optical interface 12 for inspection, cleaning and the like. Connector 10 also includes at least one actuator 60 for moving the tray 20 between the first position and the second position. Connector 10 may also include at least one alignment member 40 as shown in FIG. 2 for aligning the optical interface 12 with a port of a complimentary electronic device. For instance, the port of the complimentary device may have one or more bores for receiving the alignment members 40 and aligning the respective optical interfaces. Although, connector 10 is shown with optional electrical conductors 30m that also translate with the tray 20, other embodiments of connectors using the concepts disclosed may solely have an optical interface without electrical connectivity if desired. As depicted in FIGS. 1 and 2, a cable 90 is attached to connector 10 so that connector 10 is a portion of a cable assembly 100.

Before discussing further the details of the connectors with the translatable alignment and/or attachment structure such as the tray, the requirements for optical alignment, securing the fiber optic connector and optical fiber protection features will be reviewed. The fiber optic connectors are often used for connection with electronic devices for providing robust and reliable interconnection for transmitting large amounts of data. In this regard, in order to obtain a useful optical connection between a fiber optic connector and an electronic device it is advantageous to obtain a mechanically-secure connection to align the optical interface (e.g. linear and/or angular alignment) and provide stability to the optical interface that may have one or more optical channels such as lenses which must exchange optical signals between the connector and the electronic device. For instance, the lenses may be highly sensitive to angular misalignment and/or movement which can cause attenuation of the optical signal(s) between the connector and the electronic device. The translatable alignment and attachment structure enables a robust and secure mechanical connection between the connector and the electronic device by mechanically engaging a portion of the electronic device using the structural elements for anchoring and aligning the connector to the optical interface on the electronic device. Moreover, compared with connector designs that require movement of the optical fibers during connection, the relative fixed position of the optical fibers in the connectors disclosed protects the optical fibers from damage and wear during operation over a large number of mating cycles. Consequently, the connectors disclosed provide a robust mechanical connection with a complimentary device while preserve optical performance and inhibiting undesirable optical signal attenuation.

Figure 3:
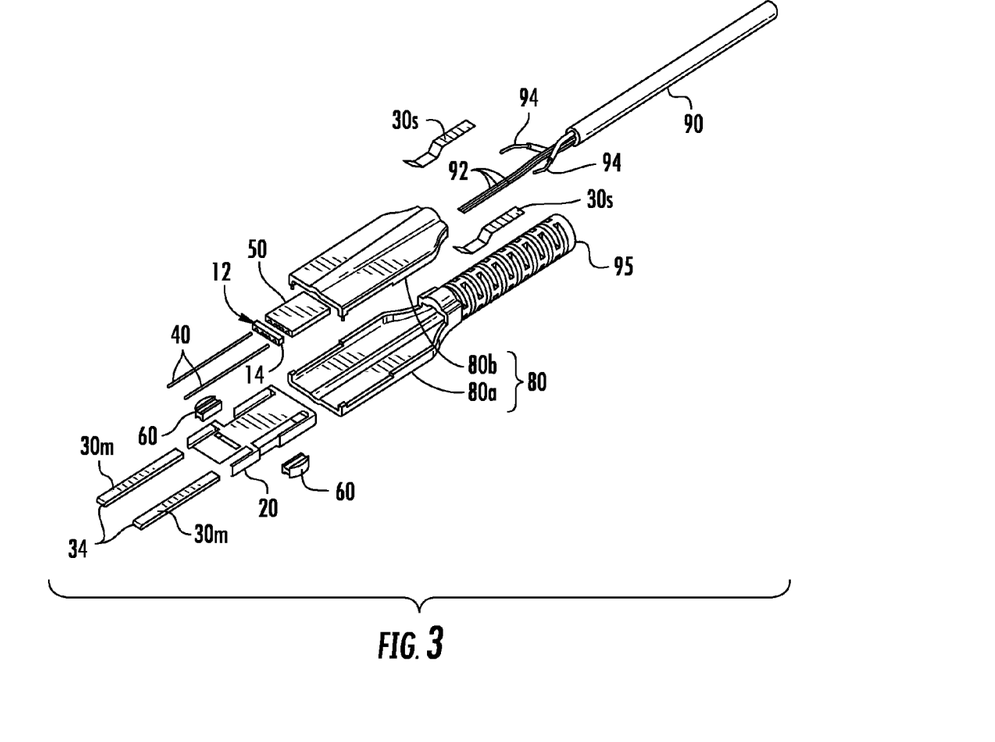
FIG. 3 is a partial exploded view of the fiber optic connector of FIGS. 1 and 2.

FIG. 3 is a partial exploded view showing details of connector 10. As further shown, connector 10 includes a fiber optic body 50 that includes an optical interface 12. The optical interface 12 may be integrally formed with the fiber optic body 50 or be a discrete component or discrete assembly having one or more lenses, which generally abuts the fiber optic body 50. In other words, the discrete component or discrete assembly abuts the end face of the fiber optic body 50 so that the optical fibers 92 are in optical communication with the lenses. By way of example, the optical interface 12 is formed as a discrete assembly in this embodiment, but could be formed as a single discrete component such as a lens block that is molded with integrated lenses and that abuts the fiber optic body 50 when assembled. Specifically, optical interface 12 of connector 10 is a GRIN chip that abuts the fiber optic body 50. The GRIN chip includes one or more gradient index (GRIN) lenses that are used for expanding the optical signal form the optical fibers of the cable 90 and improve optical coupling. The GRIN chip may be any suitable structure or method of manufacture such as disclosed in U.S. patent application Ser. No. 13/687,516, the content of which is incorporated herein by reference. In this embodiment, the GRIN chip has a lens holder body 14 having a first portion 14a and a second portion 14b and one or more GRIN lens 16 (See FIG. 8) disposed in the lens holder body 14. More specifically, first portion 14a has one or more grooves such as V- or U-grooves for positioning the GRIN lenses 16 and second portion 14b attaches to the first portion 14a to hold the GRIN lenses 16 in position.

Figure 9:
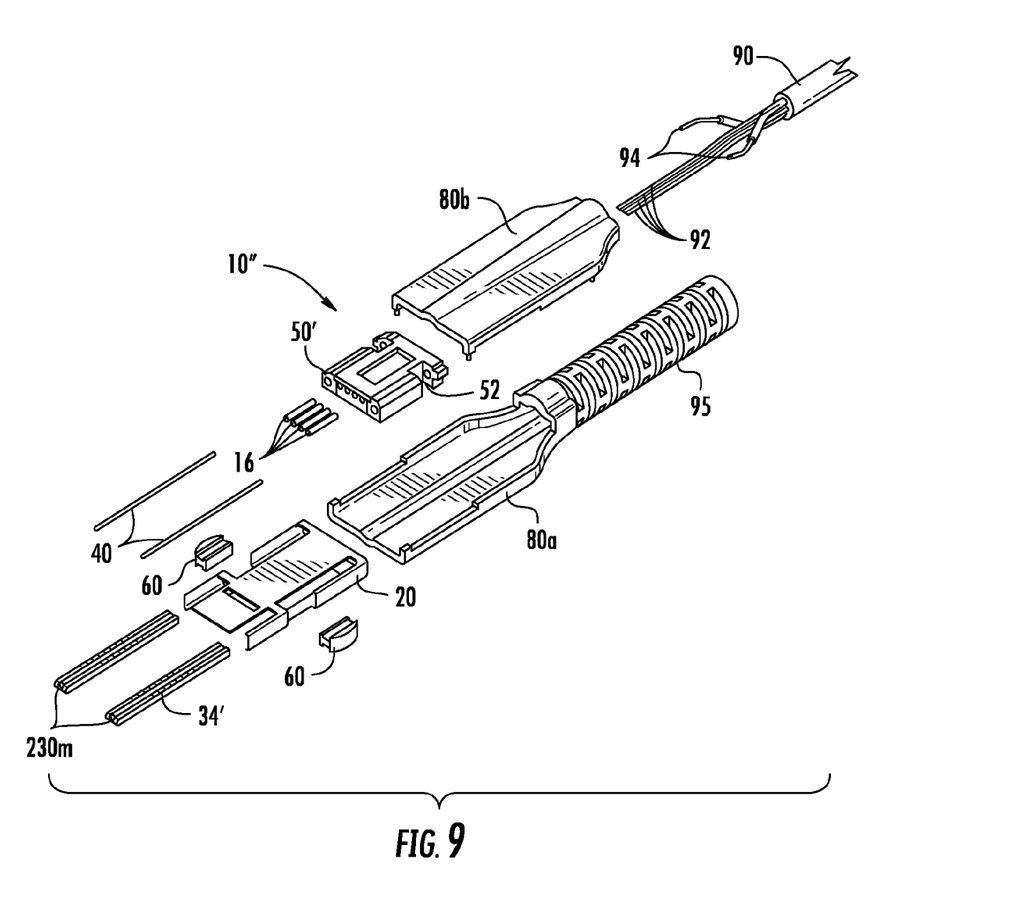
FIG. 9 is a partial exploded view showing a portion another fiber optic connector having a modified optical fiber body and another optical interface using the concepts disclosed.

In other embodiments of connectors, the fiber optic body 50 may have one or more discrete lenses such as GRIN lenses attached directly to the fiber optic body 50 (e.g., elimination of the discrete lens holder body 14 and using the fiber optic body 50 for holding the lenses as shown in FIG. 9) or directly expose the ends of optical fibers at the end face fiber optic body for forming the optical interface 12. Consequently, the optical interface 12 may include an integrated lens, a discrete lens or an optical fiber as desired. When assembled, one or more optical fibers 92 of cable 90 are attached to the fiber optic body 50 so they are in optical communication with the optical interface 12.

With continuing reference to FIG. 3, connector 10 includes one or more electrical conductors 30. The electrical conductors 30 may have any desired configuration and may have a portion that moves along with the tray or be stationary as desired depending on the particular configuration. In this embodiment, the electrical conductors 30 include stationary portions 30s and movable portion 30m. Stationary portions 30s of electrical conductors 30 are electrically attached to one or more respective electrical conductors 94 of cable 90. Whereas, movable portion 30m of electrical conductors 30 move with tray 20 between the first position and the second position as discussed herein; however, the optical interface 12 does not move with the tray 20. As depicted, connector 10 has first and second electrical conductors 30 that are disposed on opposite sides of the optical interface 12. The movable portions 30m of electrical contacts 30 are attached to one or more respective rails 34 that also translate. Rails 34 are formed from a dielectric material and electrically isolate the movable portions 30m of electrical contracts 30 from the tray 20. Rails 34 may have a complimentary shape to tray 20 for securing the rails 34 to the tray 20. By way of example, rails 34 may have one or more recesses, notches, pins, bores, etc. for cooperating with one or more portions of tray 20 and can use any suitable method such as adhesive or fasteners for attaching rails 34 to the tray 20. Likewise, the rails 34 may have a complimentary shape for securing the movable portions 30m of electrical contracts 30 to the rails 34.

Figure 4:
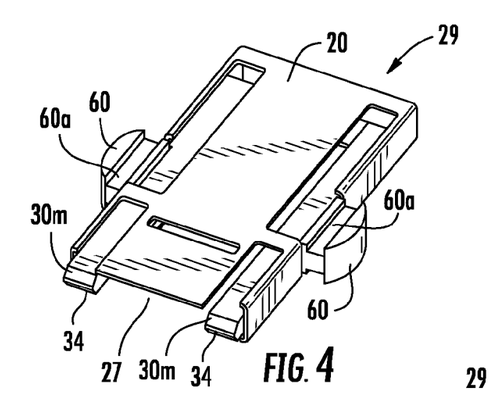
FIG. 4 is a perspective view of a tray assembly having a portion of the electrical conductors that are movable in the fiber optic connector of FIGS. 1 and 2.

FIG. 4 is a perspective view of tray 20 along with the portion of the electrical conductors 30m and rails 34 that are movable and attached to tray 20. Also shown in FIG. 4 are actuators 60 attached to the tray 20. When assembled, one or more actuators 60 are exposed at a portion of housing 80 and used for translating the tray 20 and other associated components from the first position to the second position and vice versa. As depicted, connector 10 includes a first actuator 60 and a second actuator 60 disposed on opposite sides of tray 20. The tray 20, portion of electrical conductors 30m, rails 34 and actuators 60 form a tray assembly 29, but tray assembly 29 may include more or fewer components. In this embodiment, tray 20 has an open side 27. Open side 27 has a length that extends to an engagement end (e.g., front side) of the tray 20, but the tray 20 may have a closed hoop structure at the rear portion for structural integrity and attachment of one or more alignment members 40 thereto. Open side 27 of tray 20 allows for easy construction of the assembly to the lower portion 80a of housing 80. In other words, the open side 27 allows the tray 20 to fit about the fiber optic body 50 and translate relative thereto without interference.

Figure 5:
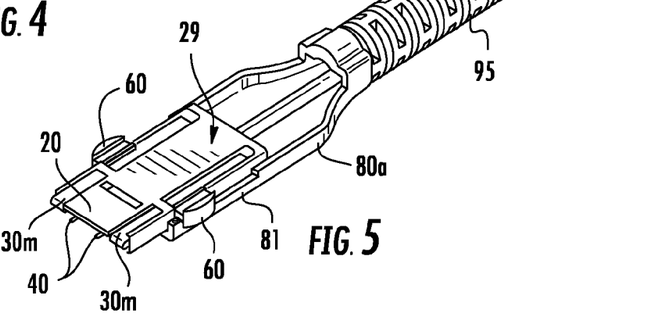
FIG. 5 is a perspective view of a partially assembled fiber optic connector of FIGS. 1 and 2 with the tray assembly shown in a portion of the housing and the cable removed for clarity.

FIG. 5 is a perspective view of a partially assembled connector 10 with the tray assembly 29 shown disposed in a portion of the housing 80. As best shown in FIG. 3, Housing 80 has a lower portion 80a and an upper portion 80b and only the lower portion 80a is shown in FIG. 5. As depicted, tray 20 has a suitable size to fit into the housing 80a while allowing access to one or more actuators 60. Housing 80 has one or more cutouts 81 that receive a portion of actuators 60 for allowing translation of the tray assembly 29. Actuators 60 includes one or more recesses 60a that cooperate with the sidewalls of housing 80 for assembly and providing tracking relative to the housing 80. Moreover, cutouts 81 may act as travel limiters or stops for the tray assembly 29. Cutouts 81 may also include features such as notches, ridges, detents, etc. for locking the actuators 60 in the extended position to inhibit unintended rearward movement during mating of the connector. In still other embodiments, the actuators 60 may be spring-loaded for engagement/disengagement as desired.

Figure 6:
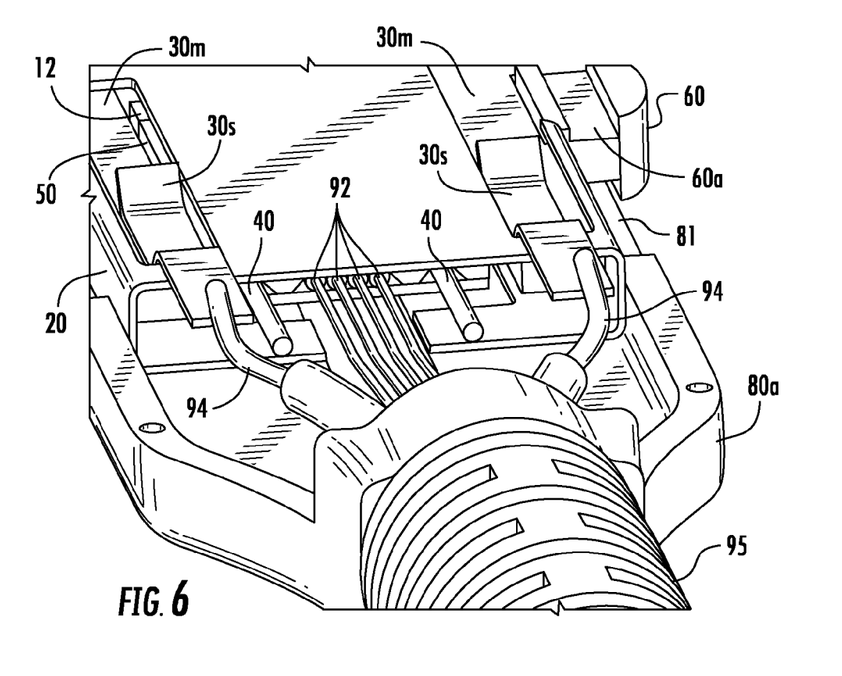
FIG. 6 is a rear detailed perspective view showing the cable components attached to the fiber optic connector.

In this embodiment, alignment members 40 are securely attached to the tray 20 as best shown in FIG. 6 so that the translate with the tray 20 and move (e.g., piston in and out) with respect to the essentially fixed fiber optic body 50 and optical interface 12. Consequently, fiber optic body 50 and the lens holder body 14 have respectively sized alignment members pathways (not numbered) for allowing the translation of the alignment members 40 within the same. Alignment members 40 provide fine alignment between the optical interface 12 and the respective optical interface of the complimentary device for mating. In this embodiment, alignment members 40 are configured as a first alignment pin and a second alignment pin, but other suitable alignment members are possible using the concepts disclosed.

FIG. 6 is a rear detailed perspective view showing the cable 90 attached to connector 10 showing details of the assembled cable assembly 100. Optical fibers 92 of optical cable 90 are shown entering the rear end of fiber optic body 50 so they are in optical communication with the optical interface 12. In other words, the optical fibers 92 enter and are secured to the fiber optic body 50 so they are adjacent to and in optical communication with the optical interface 12. In this embodiment, respective optical fibers 94 are positioned and secured so they are adjacent to the rear portions of GRIN lenses 16 within lens holder body 14. The optical fibers 92 may be secured to the optical fiber body 50 using a suitable adhesive and may also include an index matching material on the end faces for improving optical coupling. In other embodiments, fiber optic body 50 may have a monolithic construction (e.g., single component) or may be formed from a plurality of components as discussed and the optical fibers are positioned and secured appropriately.

As further depicted in FIG. 6, electrical conductors 94 of cable 90 are electrically attached to the respective stationary portions 30s of electrical conductors 30. Also depicted is the electrical connection between the respective stationary portions 30s and movable portions 30m of electrical contacts 30. Specifically, stationary portions 30s and movable portions 30m of electrical contacts 30 have a wiping electrical connection for allowing the translation of the movable portions 30m relative to the stationary portions 30s while maintaining electrical connection therebetween. As shown, alignment members 40 are securely attached to a rear portion of tray 20 so they can translate with the tray 20. For instance, alignment members 40 may be attached by welding them to the tray 20 in the desired position.

Figure 7:
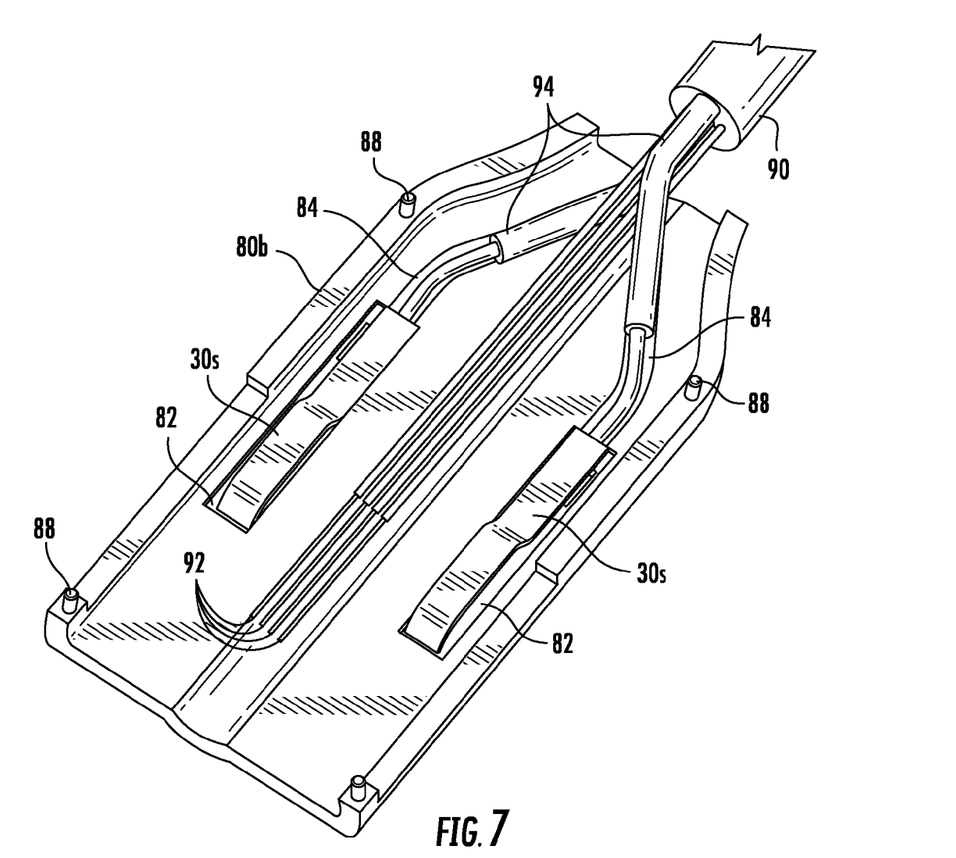
FIG. 7 is a perspective view showing how the stationary portion of the electrical conductors are seated in a portion of the housing.

FIG. 7 is a perspective view showing how the stationary portions 30s of the electrical conductors 30 are seated in housing 80. Specifically, housing 80 may have one or more contours 82 for seating stationary portions 30s of electrical conductors 30 therein. Likewise, the housing 80 may also have one or more pathways 84 for guiding and receiving the optical fibers 92 or electrical conductors 94 of cable 90 such as shown. Housing 80 may also include one or more alignment and securing features 88 such as tabs, pins, or holes for aligning the lower portion 80a and upper portion 80b together when assembled. Connector 10 may also optionally include a boot 95 for providing bending strain-relief of the cable 90 where it attaches to the back portion of the housing 80. Boot 95 can be attached to a rear barrel portion of the housing 80.

Figure 8:
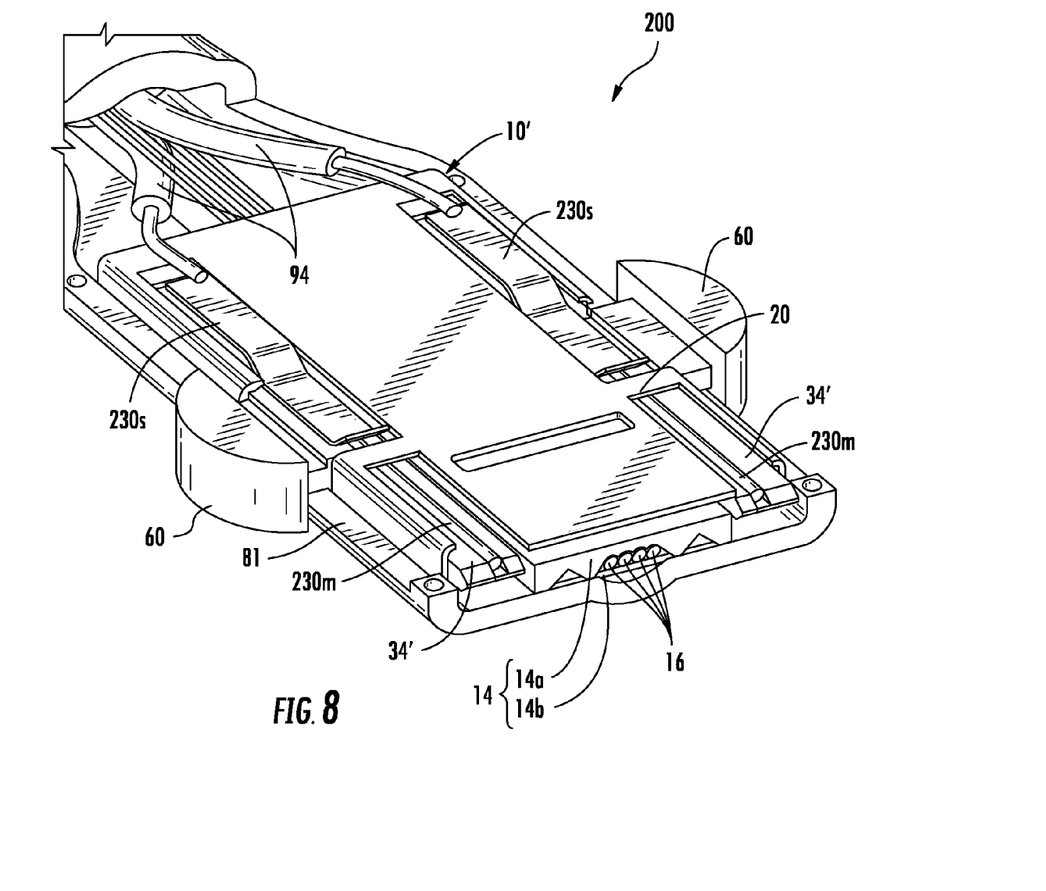
FIG. 8 is a perspective view of a portion of another fiber optic connector with a portion of the housing removed for clarity to show the movable portion of the electrical conductors.

FIG. 8 is a perspective view of a portion cable assembly 200 having another fiber optic connector 10' (hereinafter connector 10') that is similar to connector 10. Connector 10' is depicted with a portion of the housing 80 removed for clarity to show details of the design. Specifically, connector 10' has a modification to the electrical conductors compared with connector 10. Specifically, connector 10' includes rails 34' that have respective grooves for seating respective movable portions 230m of the electrical conductors 230. Although, the electrical connection between the stationary portions 230s and moving electrical conductors 230m is still a wiping electrical contact, the surface area of contact therebetween is reduced.

FIG. 9 is a partial exploded view showing concepts for another fiber optic connector 10" that is similar to connector 10' but with some components of the connector not shown for clarity purposes, expect it includes a modified optical fiber body 50'. In this embodiment, optical fiber body 50' receives the lenses 16 at a front end in suitable sized openings that lead to the optical fiber passageways instead of using a discrete lens holder body like the other embodiments disclosed. Consequently, the front end of optical fiber body 50' becomes the optical interface 12. Further, optical fiber body 50' includes notches 52 at the side portions that received the alignment members 40, thereby reducing the contact area between the alignment members 40 and optical fiber body 50'. The notches 52 also provide a cleaning characteristic for wiping off any dirt or debris from the alignment members 40.

Methods for making the connectors are also disclosed. In one embodiment, a method of making a cable assembly having a fiber optic connector includes providing a fiber optic body having an optical interface with at least one optical channel, placing the fiber optic body into a housing, providing at least one optical fiber in optical communication with the at least one optical channel of the optical interface, providing a tray that is movable between a first position that retracts into the housing and a second position where the tray extends from the housing, and the fiber optic body is essentially stationary with respect to the tray, and providing an actuator for moving the tray between the first position and the second position.

Many modifications and other variations of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A fiber optic connector, comprising:
a housing;
a fiber optic body having an optical interface with at least one optical channel;
at least one optical fiber in optical communication with the at least one optical channel of the optical interface, the at least one optical fiber being attached to the fiber optic body;
a tray that is movable between a first position that retracts the tray into the housing and a second position where the tray extends from the housing, wherein the fiber optic body is fixed at a position inside the housing independent of the tray being located at the first position or the second position;
at least one alignment member that translates with the tray when moved from the second position to the first position;
at least one rail attached to the tray; and
an actuator for moving the tray between the first position and the second position.

2. The fiber optic connector of claim 1, wherein the optical interface is accessible at a front end of the housing when the tray is in the first position.

3. The fiber optic connector of claim 1, further including one or more electrical conductors.

4. The fiber optic connector of claim 3, wherein the electrical conductors include a stationary portion and a movable portion.

5. The fiber optic connector of claim 4, wherein the movable portion of the electrical conductors move with the tray between the first position and the second position and the optical interface does not move with the tray.

6. The fiber optic connector of claim 1, wherein the tray has an open side at an engagement end.

7. The fiber optic connector of claim 1, wherein the tray has one or more windows for receiving the actuator and allowing movement of the actuator.

8. The fiber optic connector of claim 1, further including a second actuator on opposite sides of the housing.

9. The fiber optic connector of claim 1, wherein the optical interface includes an integrated lens, a discrete lens or the at least one optical fiber.

10. The fiber optic connector of claim 1, wherein the at least one alignment member includes one or more alignment pins being attached to the tray.

11. The fiber optic connector of claim 1, wherein one or more components of the fiber optic connector provide coarse alignment for the optical interface before one or more guide pins engage.

12. The fiber optic connector of claim 1, wherein the fiber optic connector is a portion of a cable assembly.

13. A fiber optic connector, comprising:
a housing;
a fiber optic body having an optical interface with at least one optical channel;
at least one optical fiber in optical communication with the at least one optical channel of the optical interface, the at least one optical fiber being attached to the fiber optic body;
a tray that is movable between a first position that retracts the tray into the housing and a second position where the tray extends from the housing, wherein the fiber optic body is fixed at a position inside the housing independent of the tray being located at the first position or the second position, wherein the optical interface is accessible at a front end of the housing when the tray is in the first position;
one or more electrical conductors, wherein the electrical conductors include a stationary portion and a movable portion, and the movable portion of the electrical conductors move with the tray between the first position and the second position and the optical interface and the stationary portion of the electrical conductors do not move with the tray;
at least one alignment member that translates with the tray when moved from the second position to the first position;
at least one rail attached to the tray; and
an actuator for moving the tray between the first position and the second position.

14. The fiber optic connector of claim 13, wherein the tray has an open side at an engagement end.

15. The fiber optic connector of claim 13, wherein the tray has one or more windows for receiving the actuator and allowing movement of the actuator.

16. The fiber optic connector of claim 13, further including a second actuator on opposite sides of the housing.

17. The fiber optic connector of claim 13, wherein the optical interface includes an integrated lens, a discrete lens or the at least one optical fiber.

18. The fiber optic connector of claim 13, wherein the at least one alignment member includes one or more alignment pins being attached to the tray.

19. The fiber optic connector of claim 13, wherein one or more components of the fiber optic connector provide coarse alignment for the optical interface before one or more guide pins engage.

20. The fiber optic connector of claim 13, wherein the fiber optic connector is a portion of a cable assembly.

* * * * *